United States Patent [19]
Redden et al.

[11] Patent Number: 5,488,640
[45] Date of Patent: Jan. 30, 1996

[54] METHOD AND APPARATUS FOR RE-ESTABLISHMENT OF A COMMUNICATION

[75] Inventors: James P. Redden, Mesa; David Terris, Phoenix; Keith A. Olds, Mesa, all of Ariz.

[73] Assignee: Motorola, Inc., Schaumburg, Ill.

[21] Appl. No.: 298,633

[22] Filed: Aug. 31, 1994

[51] Int. Cl.⁶ .................................................. H04L 7/00
[52] U.S. Cl. ........................ 375/357; 370/104.1; 455/13.2
[58] Field of Search .................................. 375/222, 223, 375/357; 455/8, 9, 10, 12.1, 13.2; 370/104.1

[56] References Cited

U.S. PATENT DOCUMENTS

| | | | |
|---|---|---|---|
| 4,811,380 | 3/1989 | Spear | 379/60 |
| 4,956,851 | 9/1990 | Wolensky et al. | 375/222 X |
| 5,007,047 | 4/1991 | Sridhar et al. | 375/222 X |

*Primary Examiner*—Stephen Chin
*Assistant Examiner*—Kevin Kim
*Attorney, Agent, or Firm*—Gregory J. Gorrie

[57] ABSTRACT

Ongoing communications over radio links between communication stations and subscriber units may be unexpectedly broken. Where the communication stations include low-Earth orbit satellites, communication links are difficult to re-establish because of the timing differential and Doppler-frequency shift associated with the satellite's movement. The communication link is re-established by initially changing the modulation technique in an attempt to re-synchronize the communication station and the subscriber unit. If this fails, the subscriber unit performs an acquisition attempt on another antenna beam of the communication station. If this is not successful, the subscriber may perform an acquisition attempt on antenna beams of another communication station.

14 Claims, 6 Drawing Sheets

METHOD AND APPARATUS FOR RE-ESTABLISHMENT OF A COMMUNICATION

TECHNICAL FIELD OF THE INVENTION

The present invention relates generally to communication systems that communicate over radio-frequency links. More specifically, the present invention relates to re-establishing a call when the signal has been lost.

BACKGROUND OF THE INVENTION

In communication systems that transmit over radio links, the radio link may be unexpectedly broken and the communication interrupted. The interruption can occur for a variety of reasons such as loss of synchronization between the communicating parties, increased attenuation of the signals, fading caused loss of signal of sufficient duration or equipment failure.

Prior art systems attempt to re-initiate communications by assuming that the prior communication channel remains available. The disadvantages to these systems is that it is desirable to reassign the prior communication channel to other users. Furthermore, there is no provision in these systems to deal with re-establishment of a communication when there is relative movement between the communicating parties.

Thus what is needed is a means and method to re-establish a communication link that takes into consideration relative movement of two communicating parties. What is also needed is a method of call re-establishment that is applicable for recovering from interruptions caused by other effects such as signal attenuation. What is also needed is a method for call re-establishment that recognizes when further attempts to re-establish a call are likely to be futile and releases any resources being held in support of the call.

DETAILED DESCRIPTION OF THE DRAWINGS

A "satellite" is defined herein to mean a man-made object or vehicle intended to orbit Earth and includes both geostationary and orbiting satellites and/or combinations thereof including low earth orbiting (LEO) satellites. A "constellation" is defined herein to mean an ensemble of satellites arranged in orbits for providing specified coverage (e.g., radio communication, photogrammetry, etc.) of portion(s) or all of the celestial body. A constellation typically includes multiple rings (or planes) of satellites and may have equal numbers of satellites in each plane, although this is not essential. As used herein the terms "cell" and "antenna pattern" are not intended to be limited to any particular mode of generation and include those created by either terrestrial or satellite cellular communications systems and/or combinations thereof.

Figure 1:
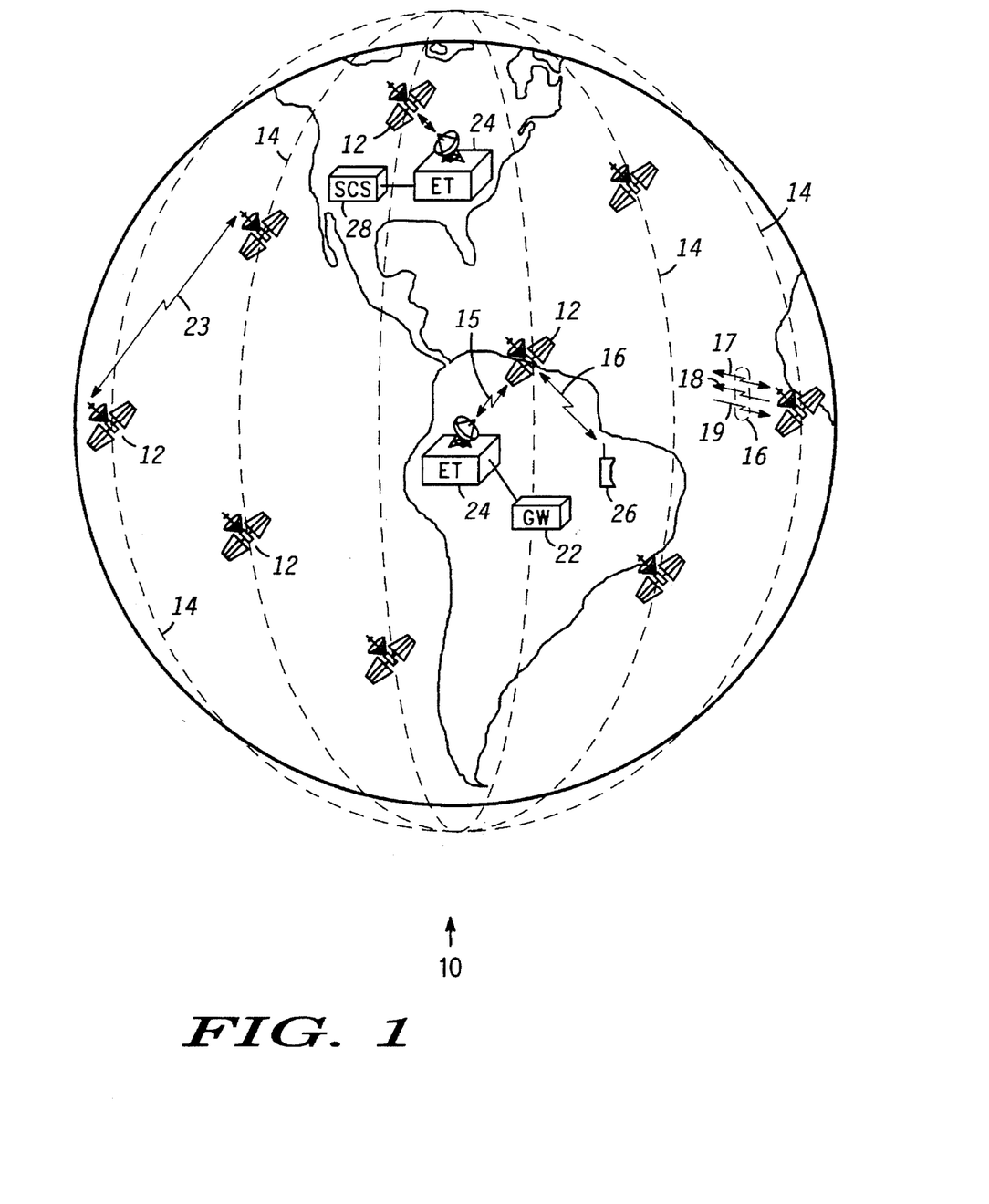
FIG. 1 illustrates a highly simplified diagram of a satellite based communication system.

FIG. 1 illustrates a highly simplified diagram of a satellite-based communication system with which the present invention may be practiced. Communication system 10 uses six polar orbits 14, with each orbit 14 holding eleven satellites 12 for a total of sixty-six satellites 12. However, this is not essential and more or fewer satellites, or more or fewer orbits, may be used. While the present invention is advantageously employed when a large number of satellites are being used, it is also applicable with as few as a single satellite. For clarity, FIG. 1 illustrates only a few of satellites 12.

For example, each orbit 14 encircles Earth at an altitude of around 780 km, although higher or lower orbital altitudes may be usefully employed. Due to the relatively low orbits of exemplary satellites 12, substantially line-of-sight electromagnetic (e.g., radio, light etc.) transmission from any one satellite or reception of signals by any one satellite involves or covers a relatively small area of Earth at any instant.

For the example shown, satellites 12 travel with respect to Earth at around 25,000 km/hr, allowing satellite 12 to be visible to a terrestrial station for a maximum period of circa nine minutes. The present invention is applicable to systems including satellites having low-Earth, medium-Earth and geo-synchronous orbits. Additionally, it is applicable to orbits having any angle of inclination (e.g., polar, equatorial or other orbital pattern).

Satellites 12 communicate with terrestrial stations which may include some number of radio communication subscriber units (SUs) 26 and earth terminals (ETs) 24 connected to system control segment (SCS) 28. ETs 24 may also be connected to gateways (GWs) 22, which provide access to the public switched telephone network (PSTN) or other communications facilities. Only one each of GWs 22, SCS 28 and SUs 26 are shown in FIG. 1 for clarity and ease of understanding. ETs 24 may be co-located with or separate from SCS 28 or GW 22. ETs 24 associated with SCSs 28 receive data describing tracking of satellites 12 and relay packets of control information while ETs 24 associated with GWs 22 only relay data packets (e.g., relating to calls in progress).

SUs 26 may be located anywhere on the surface of the Earth or in the atmosphere above the Earth. SUs 26 are preferably communications devices capable of transmitting data to and receiving data from satellites 12. By way of example, SUs 26 may be a hand-held, portable cellular telephone adapted to communicate with satellites 12. Ordinarily, SUs 26 need not perform any control functions for communication system 10.

System 10 may accommodate any number, potentially in the millions, of subscriber units 26. In the preferred embodiments of the present invention, subscriber units 26 communicate with nearby satellites 12 via subscriber links 16. Links 16 encompass a limited portion of the electromagnetic spectrum that is divided into numerous channels. Links 16 are preferably combinations of L-Band frequency channels and may encompass Frequency Division Multiplex Access (FDMA) and/or Time Division Multiple Access (TDMA) communications (infra) or combination thereof. As a minimum, a satellite 12 continuously transmits over one or more broadcast channels 18. Subscriber units 26 synchronize to broadcast channels 18 and monitor broadcast channels 18 to detect data messages which may be addressed to them. Subscriber units 26 may transmit messages to satellites 12 over one or more acquisition channels 19. Broadcast channels 18 and acquisition channels 19 are not dedicated to any one subscriber unit 26 but are shared by all subscriber units 26 currently within view of a satellite 12.

On the other hand, traffic channels 17 are two-way channels that are assigned to particular subscriber units 26 by satellites 12 from time to time. In the preferred embodiments of the present invention, a digital format is used to communicate data over channels 17–19, and traffic channels 17 support real-time communications. At least one traffic channel 17 is assigned for each call, and each traffic channel 17 has sufficient bandwidth to support, as a minimum, a two-way voice conversation. To support real-time communications, TDMA scheme is desirably used to divide time into frames, preferably in the 60–90 millisecond range. Particular traffic channels 17 are assigned particular transmit and receive time-slots, preferably having durations in the 3–10 millisecond range, within each frame. Analog audio signals are digitized so that an entire frame's signal is transmitted or received in a single short high speed burst during an allotted time-slot. Preferably, each satellite 12 supports up to a thousand or more traffic channels 17 so that each satellite 12 can simultaneously service a like number of independent calls.

Satellites 12 communicate with other nearby satellites 12 through cross links 23. Thus, a communication from a subscriber unit 26 located at any point on or near the surface of the earth may be routed through the constellation of satellites 12 to within range of substantially any other point on the surface of the earth. A communication may be routed down to a subscriber unit 26 on or near the surface of the earth from a satellite 12 using a subscriber link 16. Alternatively, a communication may be routed down to or up from any of many ETs 24, of which FIG. 1 shows only two, through earth links 15. ETs 24 are preferably distributed over the surface of the earth in accordance with geo-political boundaries. In the preferred embodiments, each satellite 12 may communicate with up to four ETs 24 and over a thousand-subscriber units 26 at any given instant.

SCS 28 monitors the health and status of system communication nodes (e.g., GWs 22, ETs 24 and satellites 12) and desirably manages operations of communication system 10. One or more ETs 24 provide the primary communications interface between SCS 28 and satellites 12. ETs 24 include antennas and RF transceivers and preferably perform telemetry, tracking and control functions for the constellation of satellites 12.

GWs 22 may perform call processing functions in conjunction with satellites 12 or GWs 22 may exclusively handle call processing and allocation of call handling capacity within communication system 10. Diverse terrestrial-based communications systems, such as the PSTN, may access communication system 10 through GWs 22.

With the example constellation of sixty-six satellites 12, at least one of satellites 12 is within view of each point on Earth's surface at all times (i.e., full coverage of the Earth's surface is obtained). Theoretically, any satellite 12 may be in direct or indirect data communication with any SU 26 or ET 24 at any time by routing data through the constellation of satellites 12. Accordingly, communication system 10 may establish a communication path for relaying data through the constellation of satellites 12 between any two SUs 26, between SCS 28 and GW 22, between any two GWs 22 or between SU 26 and GW 22.

Figure 2:
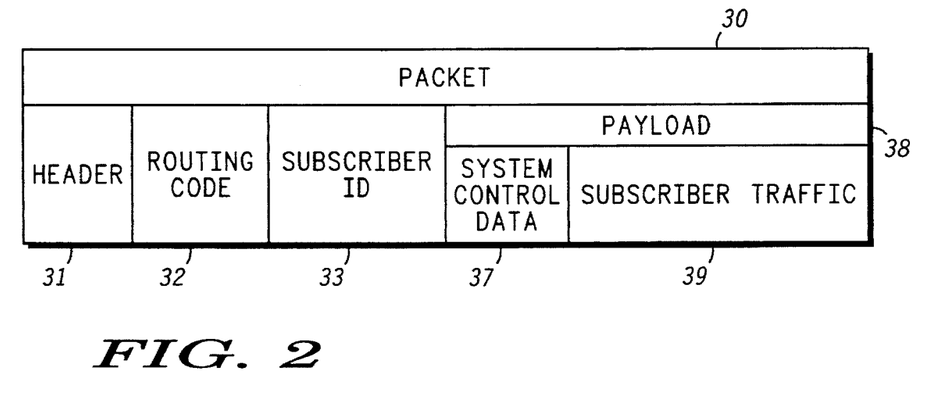
FIG. 2 illustrates an example of an exemplary data packet used to transport communications suitable for use in a preferred embodiment of the present invention.

FIG. 2 illustrates an example of an exemplary data packet used to transport communications suitable for use in a preferred embodiment of the present invention. Data packet 30 may be used to transport a communication to subscriber unit 26 (FIG. 1). As discussed above, communications in the preferred embodiments are configured in a digital format. Packet 30 includes header 31 which carries data identifying a type characterization to be associated with packet 30, a length to be associated with packet 30, and any other information conventionally included in data packet headers. The type characterization may indicate whether packet 30 exclusively conveys system control messages or whether it conveys subscriber traffic. Routing code 32 is included to instruct communication system 10 (FIG. 1) where to deliver packet 30.

Subscriber ID 33 represents a code that uniquely identifies subscriber unit 26 and that is known to the identified subscriber unit and to any satellite 12 (FIG. 1) providing traffic channel 17 (FIG. 1) to subscriber unit 26. Subscriber unit 26 monitors subscriber IDs 33 transmitted over broadcast channel 18 (FIG. 1) to determine if packets 30 are intended for it. Satellite 12 uses subscriber IDs 33 of packets 30 that carry subscriber unit traffic to route such packets 30 to traffic channels 17 assigned to the identified subscriber unit 26.

Header 31, routing code 32, and subscriber ID 33 represent overhead data which serve to get packet 30 to its destination. At the packet's destination, payload data 38 are consumed. In other words, the purpose of sending packet 30 to a destination is typically to deliver payload data 38, not header 31, routing code 32, or subscriber ID 33. Payload data 38 includes either system control data 37 or system control data 37 together with subscriber traffic 39 (e.g., voice and/or data). System control data are commands or messages which are interpreted and acted upon by subscriber units 26. These commands are typically very short. When system control data are delivered over broadcast channel 18, subscriber traffic 39 is omitted, and the resulting packet is very short so that as many messages as possible may be broadcast over broadcast channel 18. Subscriber traffic 39 represents all subscriber data transported in the course of a call. When packet 30 is delivered over traffic channel 17, a significant amount of subscriber traffic is appended. As discussed above, a digitized version of an entire frame of conversational audio may be conveyed by subscriber traffic 39.

Compared to the size of subscriber traffic 39, the length of system control data 37 is small. Thus, system control data 37 may be delivered to subscriber unit 26 along with subscriber traffic 39 while a call is ongoing. Examples of system control messages which may be delivered with subscriber traffic 39 via a traffic channel 17 include messages which inform subscriber unit 26 that the other party to a call has "hung-up" or that another call is waiting for the subscriber unit 26.

Figure 3:
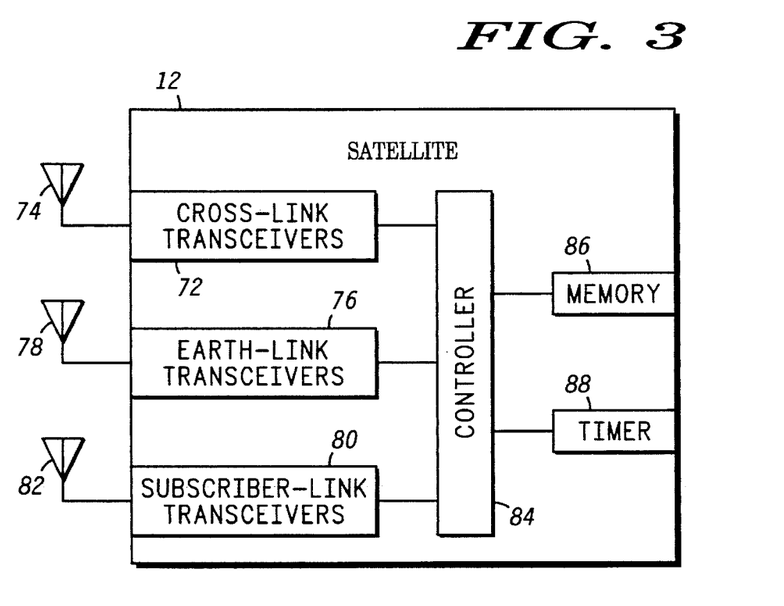
FIG. 3 illustrates a simplified block diagram of a satellite radio communication station suitable for use in a preferred embodiment of the present invention.

FIG. 3 illustrates a simplified block diagram of a satellite radio communication station suitable for use in a preferred embodiment of the present invention. Preferably, all satellites 12 within system 10 (see FIG. 1) include equipment as illustrated by the block diagram of FIG. 3. Satellite 12 includes cross-link transceivers 72 and associated antennas 74. Transceivers 72 and antennas 74 support cross-links to other nearby satellites 12. Earth-link transceivers 76 and associated antennas 78 support earth-links to communicate with earth terminals 24 (FIG. 1). Subscriber-link transceivers 80 and associated antennas 82 support subscriber units 26 (FIG. 1). Preferably, each satellite 12 may simultaneously support a link for up to several thousand or more of subscriber units 26 (FIG. 1). Of course, those skilled in the art will appreciate that antennas 74, 78, and 82 may be implemented either as single multi-directional antennas or as banks of discrete antennas. It is desirable that each subscriber-link antenna 82 be a phased array antenna capable of accessing many cells simultaneously.

A controller 84 couples each of transceivers 72, 76, and 80 as well as to a memory 86 and a timer 88. Controller 84 may be implemented using one or more processors. Controller 84 uses timer 88 to maintain, among other things, the current date and time. Memory 86 stores data that serve as instructions to controller 84 and that, when executed by controller 84, cause satellite 12 to carry out procedures which are discussed below. In addition, memory 86 includes variables, tables, and databases that are manipulated during the operation of satellite 12.

Subscriber-link transceivers 80 are desirably multi-channel FDMA/TDMA transceivers capable of transmitting and receiving on all different selectable frequencies during particular, selectable, time slots as directed by controller 84. Subscriber-link transceivers 80 contain multi-channel radios having a sufficient number of channels to provide the desired number of transmission and reception frequencies for signal access and control and for the user voice and/or data. Controller 84 may provide for allocation of the frequency and time-slot assignments, cell-to-cell hand-off and other overhead and management and control functions. Subscriber-link transceivers 80 desirably provide for transmission and reception on any frequency channel set so that each subscribers-link transceivers 80 may, if needed, utilize the entire spectral capacity of all frequency channel sets by having the capability to handle all frequency and time slot assignments.

Figure 4:
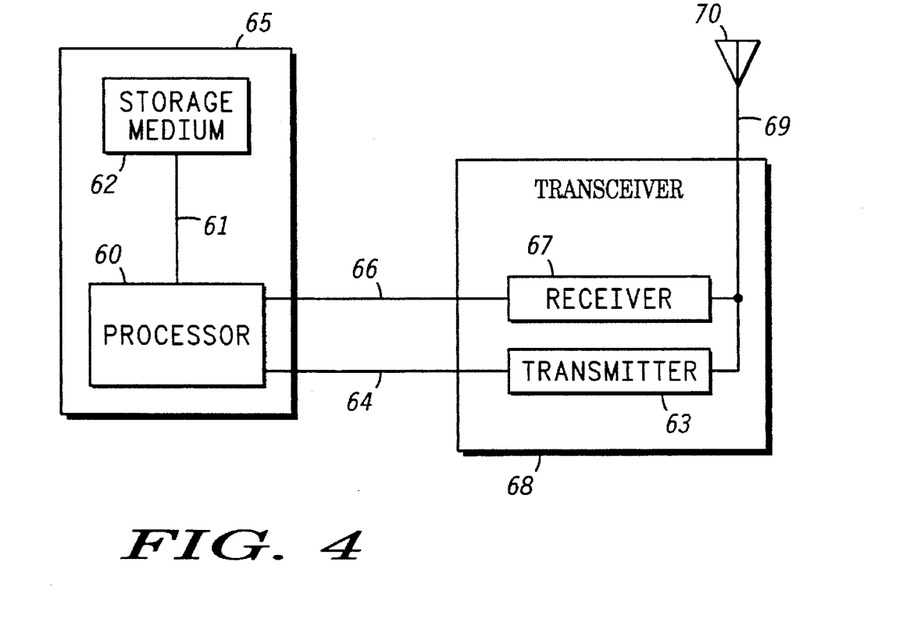
FIG. 4 illustrates a simplified block diagram of a system control station and an earth terminal suitable for a preferred embodiment of the present invention.

FIG. 4 illustrates a simplified block diagram of a system control station and an earth terminal suitable for use in a preferred embodiment of the present invention. Control station 65 and terrestrial station 68 are desirably part of SCS 28 (FIG. 1) and ET 24 (FIG. 1) respectively. Control station 65 comprises processor 60 coupled to associated storage medium 62 (e.g., random access memory or RAM, other semiconductor or magnetic read-write memory devices, optical disk, magnetic tape, floppy disk, hard disk etc.) via link 61. Terrestrial station 68 includes antenna 70 coupled to transmitter 63 and receiver 67 via link 69. Transmitter 63 and receiver 67 are coupled to processor 60 via links 64 and 66, respectively. Processor 60 desirably carries out procedures exemplified below and described in the associated text. For example, in addition to performing other tasks as appropriate, processor 60 desirably stores results from such procedures in storage medium 62. Transmitter 63 and/or receiver 67 transmit messages to and/or receive messages from satellites 12.

Processor 60 generally controls and manages user access, message reception and transmission, channel setup, radio tuning, frequency and time slot assignment, and other cellular radio communication and control functions not managed or provided for by controller 84 (FIG. 3). Among other things, processor 60 and/or controller 84 (FIG. 3) desirably executes procedures to allow user access to communication system 10. This may include procedures for protocols for channel setup and other associated functions as discussed below.

Figure 5:
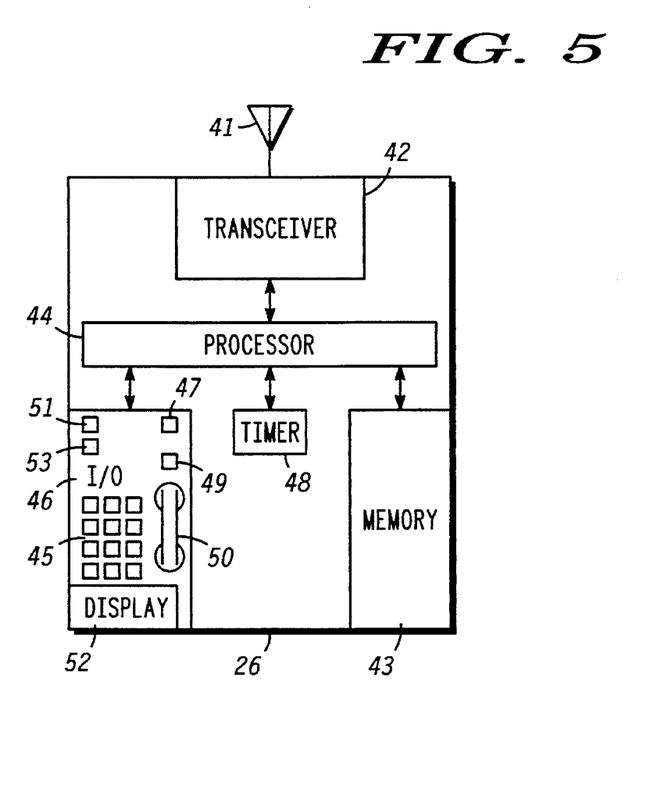
FIG. 5 illustrates a simplified block diagram of a subscriber unit suitable for a preferred embodiment of the present invention.

FIG. 5 illustrates a simplified block diagram of a subscriber unit suitable for use in a preferred embodiment of the present invention. Subscriber unit 26 (analogous to subscriber unit 26 of FIG. 1) communicates with communication system 10, and may also communicate through communication system 10 to other SUs 26 or another telecommunication device. Subscriber unit 26 includes transceiver 42 which transmits and receives signals to and from communication system 10 using antenna 41. Transceiver 42 is desirably a multi-channel transceiver capable of transmitting and receiving on all frequency channels in specified time slots as required by communication system 10.

Transceiver 42 desirably comprises an acquisition channel transceiver portion, a broadcast channel receiver portion and a traffic channel transceiver portion. The acquisition channel transceiver portion communicates on one of several acquisition channels as determined by satellite 12 and is primarily used during access protocols when a subscriber desires access to communication system 10 as previously discussed. The traffic channel transceiver portion communicates with communication system 10 on a traffic channel assigned by satellite 12. Those of ordinary skill in the art will understand that the acquisition channel transceiver portion, the broadcast channel receiver portion and the traffic channel transceiver portion may be contained in one unit capable of all three functions.

Transceiver 42 couples to a processor 44, which controls the frequency and timing parameters upon which transceiver 42 operates. In addition, processor 44 preferably controls the power level at which transceiver 42 transmits signals. Additionally, processor 44 desirably couples to input/output (I/O) section 46, timer 48, and memory 43. Processor 44 uses timer 48 to maintain the current date and time. Memory 43 includes semiconductor, magnetic, and other storage devices for storing data which serve as instructions to processor 44 and which, when executed by processor 44, cause subscriber unit 26 to carry out procedures which are discussed below. In addition, memory 43 includes variables, tables, and databases that are manipulated during the operation of subscriber unit 26.

Conventional cellular radio units and systems are described for example in U.S. Pat. Nos. 4,783,779, 4,144,412, and 5,097,499, and satellite communication systems are described for example in U.S. Pat. Nos. 4,722,083 and 4,819,227. These patents are herewith incorporated by reference. Subscriber unit antennas 82 (FIG. 3), subscriber-link transceivers 80 (FIG. 3), control station 28 (FIG. 1) and earth terminal 24 (FIG. 1) perform those functions and contain at least those equipments conventionally associated with switched terrestrial or satellite cellular communication systems, plus additional functions and equipment explained in more detail below.

The present invention provides a method and apparatus that, among other things, allows the re-establishment of a communication that has been interrupted (for example, a telephone call). Typically, an interruption is caused by a loss of synchronization on subscriber link 16 (FIG. 1) between subscriber unit 26 (FIG. 1) and satellite 12 (FIG. 1). The present invention is also applicable to other effects that may cause an interruption. In a preferred embodiment, the present invention recognizes when further attempts to re-establish a communication are likely to be futile, and aborts the effort and releases any resources being held in support of the communication.

In a preferred embodiment, the present invention includes three major portions for re-establishment of a communication. Each portion is preferably performed only when the previous portion fails to re-establish the communication. The order that the portions are performed in serves to re-establish the communication with the least disruptive procedure requiring the least amount of time. As part of the three major portions of the preferred embodiment of the present invention, the communication re-establishment effort is escalated until it succeeds in re-establishing the communication. In the preferred embodiment, the attempt to re-establish the communication is abandoned when the time required exceeds the time a reasonable person can be expected to wait following loss of a connection.

Initially, a subscriber unit processor is alerted by the timer 48 (FIG. 5) that no message has been exchanged with a satellite communication station for a predetermined period of time. In a preferred embodiment, this may be within the last 10 seconds. At substantially the same time, satellite controller 84 (FIG. 3) is alerted in a similar fashion by timer 88 concerning subscriber-link transceivers 80. The most probable reason for a loss of synchronization is fading on the subscriber link 16 (FIG. 1) causing a loss of signal. If the loss of synchronization is caused by some other mechanism, the first portion of the attempt to re-establish the call is less likely to succeed.

In performance of the first portion of the communication re-establishment procedure, both the satellite and the subscriber unit change the modulation on the traffic channel 17. For example, in the preferred embodiment, the connection is changed from Quadrature Phase Shift Keyed (QPSK) modulation to Bi-Phase Shift Keyed (BPSK) modulation. BPSK modulation allows a larger initial error in synchronization.

The subscriber unit and the satellite then attempt to cooperatively synchronize the link. This is preferably done similarly to initial acquisition of the link. If the attempt is successful, then the communication is re-established. An advantage to this approach is that only the original satellite and the subscriber unit are involved. Another advantage is that the synchronization process is a sub-step of two more complex portions of the communication re-establishment procedure described below. One result is that this first portion is likely to be accomplished in a relatively short period of time.

Should the attempt to re-synchronize the traffic channel not succeed within a small amount of time, three seconds in a preferred embodiment, the initial effort is abandoned. The satellite abandons the effort based in information from timer 88, and makes the traffic channel 17 (FIG. 1) previously allocated for the subscriber unit available. Upon abandoning the effort, the subscriber unit 26 proceeds with the next portion of call re-establishment discussed below.

In the second major portion of a preferred embodiment, the subscriber unit 26 attempts to re-establish contact with the same satellite communication station with which it was previously communicating. During the initial acquisition of the communication link, the subscriber unit preferably has been provided a Subscriber ID 33 (FIG. 2) with which to identify itself to the satellite. Subscriber ID 33 is provided early in the procedure of connecting a subscriber unit to the network. In this situation, the satellite will have de-allocated the traffic channel previously allocated for the subscriber unit, but has maintained the information that the communication exists including the subscriber ID and other information required to associate the subscriber unit with a particular call.

One possible reason for this portion of the communication re-establishment process to become necessary is that satellite motion occurring during call set-up procedures causes subscriber link 16 (FIG. 1) to fade resulting in the antenna beam providing traffic channel 17 previously assigned no longer providing coverage at the subscriber unit's current location.

The subscriber unit acquires the satellite and identifies itself using it's subscriber ID. Should this attempt not succeed within a small amount of time (i.e., three seconds in the preferred embodiment), the effort is abandoned. The satellite abandons the effort based in information from timer 88, and notifies gateway 22 that the channel has been lost. The gateway preferably starts a timer to determine if the subscriber unit reports re-establishment to the gateway within a predetermined period of time (i.e., three seconds in the preferred embodiment). Upon abandoning the effort, the subscriber unit proceeds with the next portion of the call re-establishment process.

In the third major portion of the preferred embodiment of the communication re-establishment process, the subscriber unit attempts to re-establish contact with another satellite communication station. The subscriber unit preferably has been provided with a Temporary Mobile Subscriber Identification (TMSI) with which to identify itself to a gateway. A TMSI is provided early in the process of connecting a subscriber unit to the network. The gateway is expected to have maintained the call as active, even if a satellite has reported that the traffic channel is out. If the communication link is lost before a TMSI is assigned to the communication, the communication is dropped.

The most likely reason for the third portion of the preferred embodiment of the communication re-establishment process to become necessary is satellite motion during a subscriber link 16 fade resulting in the footprint of the satellite providing the traffic channel previously assigned no longer providing coverage at the subscriber unit's current location.

In the third portion, the subscriber unit acquires another satellite and requests connection to the gateway. The subscriber unit identifies itself using the TMSI previously assigned. Should this attempt not succeed within a small amount of time (i.e., around three seconds in the preferred embodiment), the effort is desirably abandoned. When this effort is abandoned the gateway ends the communication for any connected parties, and the subscriber unit notifies the subscriber that the communication has been dropped. If at any point in the process, the needed information such as subscriber ID or TMSI is not available, the communication is preferably ended in the same fashion.

Figure 6:
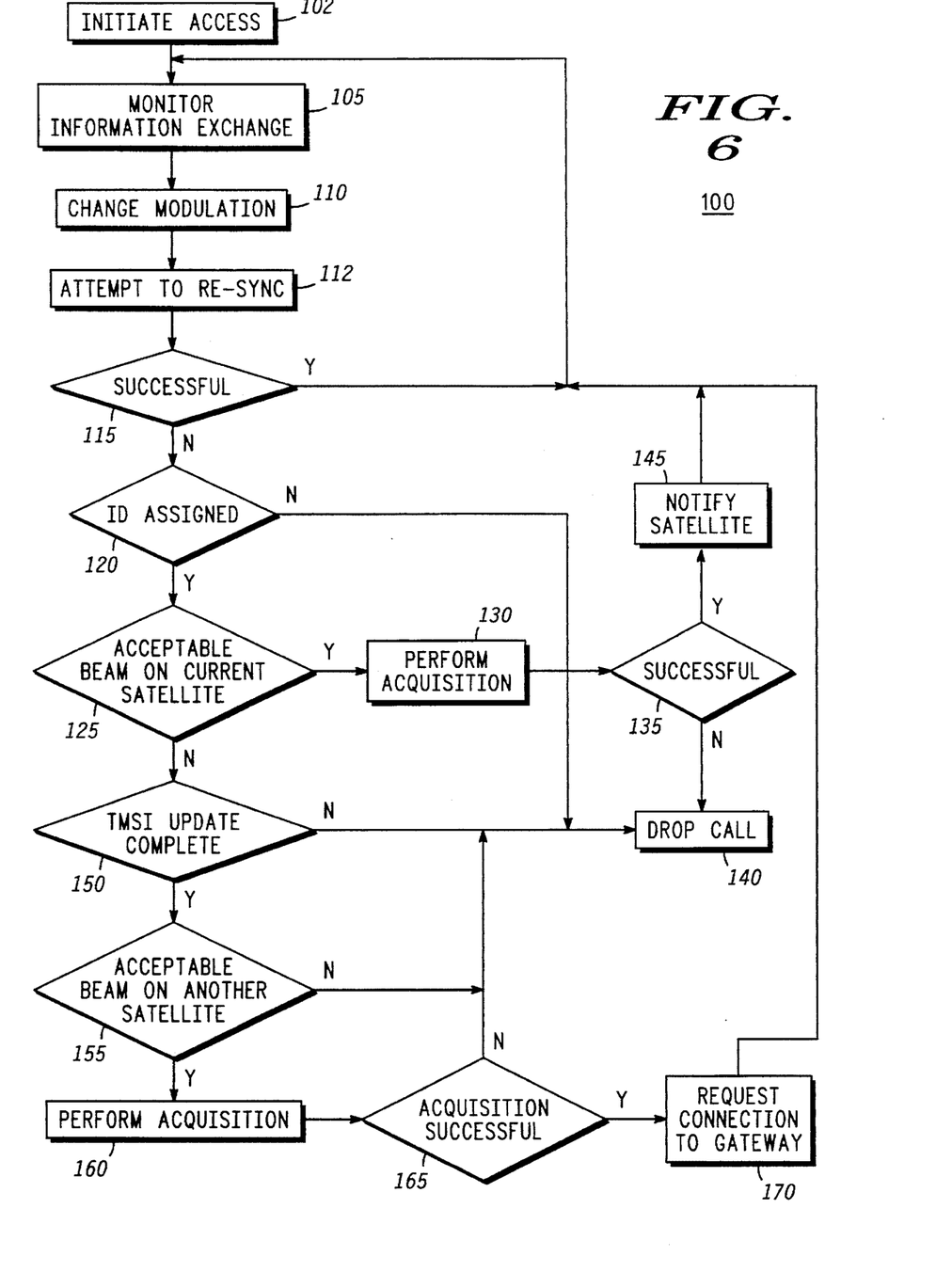
FIG. 6 shows a flow chart of a communication re-establishment procedure performed by a subscriber unit suitable for use in a preferred embodiment of the present invention.

FIG. 6 shows a flow chart of communication re-establishment procedure 100 performed by a subscriber unit suitable for use in a preferred embodiment of the present invention. In task 102, a subscriber unit is granted a traffic channel by the satellite 12 (FIG. 1) when a communication service is desired. Among other things, in task 105, the subscriber unit waits and monitors traffic channel activity. Other procedures not described here performed by the subscriber unit insure that under normal conditions, messages are exchanged on a regular basis, for example every second. If a long period of time, for example 10 seconds, passes with no exchange of information, it is reasonable to believe that synchronization has been lost, and some action must be taken to re-establish synchronization. Neither the normal frequency of message exchange nor the particular value of 10 seconds is critical to the present invention. The values are merely for illustrative purposes to aid in the understanding of the invention. The precise values are selected in such a way to determine when synchronization has been lost.

In a low-Earth orbit (LEO) satellite based system where the satellites are moving rapidly with respect to the surface, the interval in which synchronization is lost is likely to be fairly small compared to a terrestrial cellular system. This is because of the rapidly changing Doppler frequency shift and propagation delay shift exhibited by a (LEO) satellite with respect to a ground based subscriber unit. If the subscriber unit determines that it is likely that synchronization has been lost it proceeds with task 110.

In task 110 the subscriber unit changes modulation type. In the preferred embodiment, the subscriber changes from QPSK used for normal communication to BPSK used for achieving synchronization. While the particular modulation schemes are not essential to the invention, the notion of changing from a normal operational mode to a mode which permits re-synchronization of the link is important to the procedure. The change of modulation is preferably concurrent with the satellite making a similar change in task 220 of procedure 200 described below. The degree of simultaneity required is a function of the time required to re-synchronize and the wait time that is allowed in task 115 described below. Both the satellite and the subscriber unit should be in a synchronization mode concurrently for a sufficient time to provide a high confidence that synchronization will occur if adequate link margin exists.

In task 112, after making the change to the re-synchronization mode the subscriber unit attempts to cooperatively re-synchronize with the satellite. The procedure for accomplishing synchronization is preferably similar to that used for initially establishing synchronization. One such procedure suitable for use in a preferred embodiment is discussed in U.S. patent application Ser. No. 07/991,816, filed Dec. 17, 1992 which is incorporated herein by reference. Upon successful completion the subscriber unit proceeds with task 115.

In task 115, the subscriber unit waits to determine if the attempt to re-synchronize has failed to occur in a predetermined amount of time. In one embodiment, task 115 is performed concurrently with task 110 and task 112. If the synchronization attempt fails to occur within a predetermined period of time, it may be assumed that it is unlikely to succeed and should be abandoned. In a preferred embodiment the predetermined period of time is approximately 3 seconds, but the value is not critical to the present invention. The wait time should be sufficiently long to allow for a high probability of success if sufficient link margin exists, but should be sufficiently short to allow for other techniques discussed below to be applied before the human user abandons the call. If task 115 is entered because re-synchronization is successful, the subscriber unit returns to task 105 to wait until synchronization is lost again or the call ends. If task 115 aborts the re-synchronization attempt because the time limit is exceeded, the subscriber unit proceeds with task 120.

Task 120 determines if further action is possible to re-establish the communication. As discussed above, a subscriber ID is normally assigned to a subscriber unit and communicated to the subscriber unit shortly after the subscriber unit initiates communication with a satellite. In a preferred embodiment, the subscriber ID is local to the satellite, and uniquely identifies the subscriber unit only when used in conjunction with routing code 32 (FIG. 2). The subscriber ID value is essentially a logical name assigned by the satellite to the subscriber unit. It is possible to arrive at task 120 prior to assignment of a subscriber ID to the subscriber unit by the satellite. Without a value for the subscriber ID, the subscriber unit has no way to identify itself to the satellite, and no further action to recover the call is taken. In such a case, task 140 is performed and the call is dropped. If a subscriber ID has been assigned, task 125 is performed.

Task 125 determines if an acceptable quality beam exists on the current satellite. The subscriber unit routinely monitors the quality of beams other than the beam to which it is currently assigned as part of a hand-off procedure not described here. The subscriber unit can differentiate beams provided by its current satellite from those provided by other satellites by interpreting information encoded in each beam's broadcast channel 18 (FIG. 1). Selection of a beam generated by the current satellite 12 is preferable for at least two reasons. First, as described in task 150 below, continuing this procedure with another satellite 12 is dependent on the subscriber unit having already reached a certain point in other procedures not described here pertaining to the set up of a telephone call. Therefore, it is more likely that completion of this procedure will succeed with the same satellite to which the subscriber unit was connected at the time the communications outage was detected. Secondly, the entire procedure should require less time if the same satellite is used because the process requires additional tasks when another satellite is selected. If an acceptable quality beam exists on the current satellite the subscriber unit proceeds with task 130. Otherwise, it proceeds with task 150.

In task 130 the subscriber unit executes an acquisition procedure with the satellite. This procedure is preferably similar to that discussed in regard to task 112. Once entered, the acquisition procedure will continue to attempt acquisition until a satellite is acquired or the attempt is aborted.

Task 135 is a wait state that is performed concurrently with task 130. Task 135 determines if the attempt to acquire a satellite has failed to occur in a predetermined amount of time. If the attempt fails to occur within the predetermined period of time, it may be assumed that it is unlikely to succeed and should be abandoned. In the preferred embodiment this time is approximately 3 seconds, but the value is not critical. It should be sufficiently long to allow for a high probability of success if sufficient link margin exists, but should be sufficiently short to allow for other techniques to be applied before the human user abandons the call. If task 135 is entered because acquisition is successful, the subscriber unit proceeds to task 145. If this task aborts the acquisition attempt because the time limit is exceeded, task 140 is performed.

In another embodiment, task 125 can be re-iterated in the event the acquisition attempt is aborted, and task 150 described below can be performed. This embodiment is advantageous when the total elapsed time from the loss of communication to this point in the procedure is less than a predetermined period of time, for example approximately 15 seconds. Otherwise, further action to maintain the communication after attempting acquisition is unlikely to preserve the communication because the human user may be likely to abandon the call.

In task 140, the subscriber unit notifies a user of the subscriber unit that the communication has been dropped, and that no further efforts to reconnect the call will be made. The exact mechanism of notifying a user is unimportant, but desirably consists of special tones, an audible announcement, or a visual display. The notification should be provided completely by the subscriber unit with no assistance from the satellite, as no communication link exists to the subscriber unit at this time. In a preferred embodiment, the dropping of the communication by a subscriber unit consists of notifying a user and returning the subscriber unit to a state from which the user may initiate another operation. In this state, the subscriber unit may also desirably receive an incoming call ring signal.

In task 145, the subscriber unit identifies itself to the satellite as a subscriber unit with a connection on another channel on the same satellite currently assigned. The subscriber unit identifies itself to the satellite by providing the subscriber ID value previously supplied to it by the satellite. Following task 145, the connection has been re-established and the subscriber unit returns to task 105, to monitor for another loss of synchronization.

Task 150 determines if further action is possible for re-establishment of the communication when no available beam exists on the current satellite. A Temporary Mobile Subscriber Identifier (TMSI) value is normally assigned to a subscriber unit and communicated to the subscriber unit shortly after the subscriber unit initiates communication with a gateway 22 (FIG. 1). This value is used to identify the subscriber unit at the gateway. Without this value the subscriber unit has no means to identify itself to the gateway and no further action to re-establish the call is possible. In such a case, task 140 is executed. If a TMSI has been assigned task 155 is executed.

While a TMSI is used in a preferred embodiment, any identifier provided by the subscriber unit to the gateway can be used to allow the gateway to recognize the subscriber unit as one currently connected to the gateway would be sufficient.

Task 155 determines if an available beam of acceptable quality exists on any satellite in view of the subscriber unit. Task 155 is similar to task 125 except the subscriber unit limits its possible selection to satellites other than the satellite to which the subscriber unit was connected when synchronization was lost. If an acceptable quality beam exists, task 160 is executed. Otherwise, task 140 is executed and the call is dropped.

In task 160, the subscriber unit executes an acquisition procedure with the new satellite identified in task 155. This procedure is preferably similar to that discussed in regard to task 112.

In task 165, the subscriber unit waits until the acquisition attempt is successful. Task 165 is desirably performed concurrently with task 160. In a preferred embodiment, task 165 determines if the acquisition attempt of task 160 has been successful in less than three seconds, although longer or shorter time periods are acceptable. If the acquisition is successful, the subscriber unit proceeds to task 170. If task 165 aborts the acquisition attempt because the time limit is exceeded, the subscriber unit proceeds with task 140 and the call is dropped.

In task 170, the subscriber unit identifies itself to a satellite as a subscriber unit with a connection already established at the gateway. The subscriber first notifies the satellite that it has acquired the satellite for purposes of re-connecting an existing call. The subscriber unit specifies the gateway to which it should be connected by specifying the gateway which assigned the TMSI. The satellite establishes a logical connection between the subscriber unit and the specified gateway.

The subscriber unit identifies itself to the gateway by providing the TMSI value previously supplied to it by the gateway. The gateway re-establishes the connection to the distant party by connecting the subscriber unit to the party associated with the specified TMSI. The procedure returns to task 105, monitoring for a subsequent loss of synchronization.

As noted above, while a TMSI is used in a preferred embodiment, any identifier may be used that can be provided by the subscriber unit to the gateway to allow the gateway to recognize the subscriber unit as one currently connected to the gateway would be sufficient.

Figure 7:
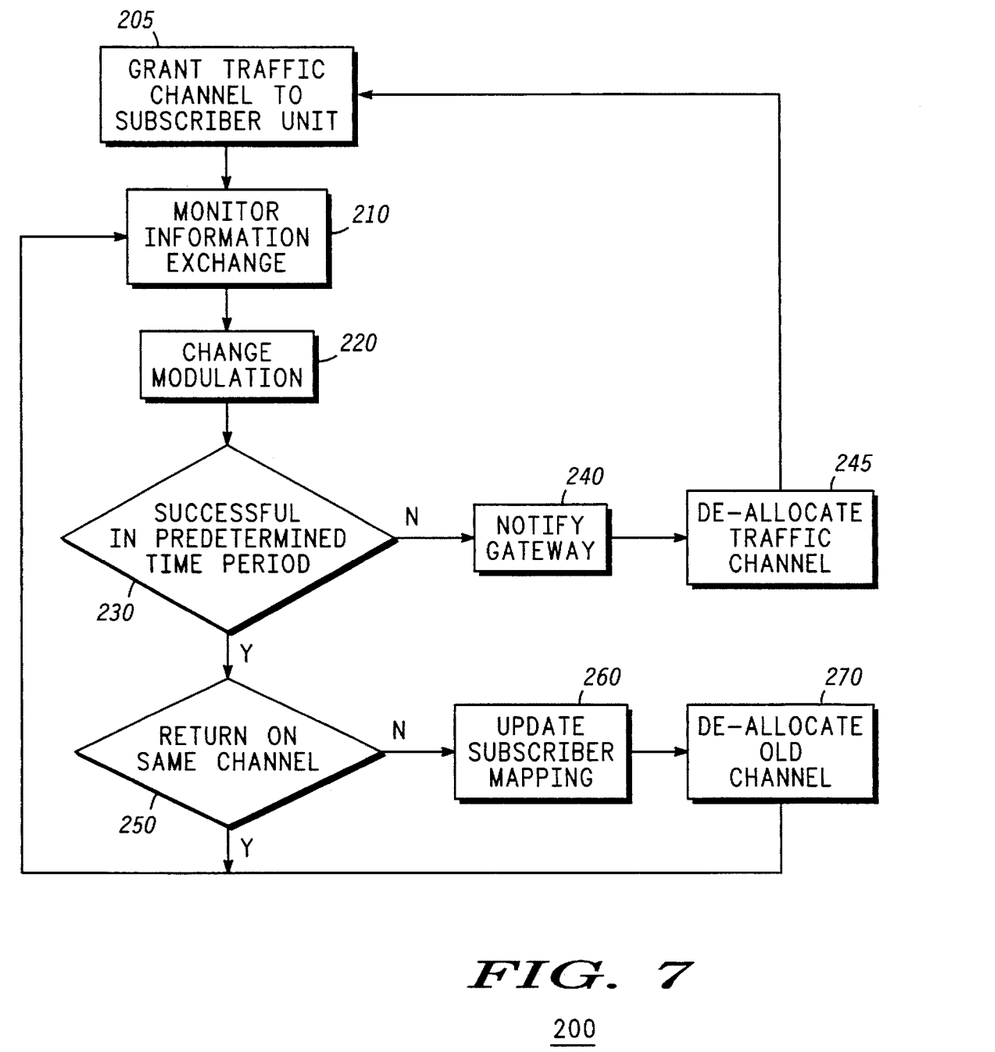
FIG. 7 shows a flow chart of a communication re-establishment procedure performed by a satellite communication station suitable for use in a preferred embodiment of the present invention.

FIG. 7 shows a flow chart of communication re-establishment procedure 200 performed by a satellite communication station suitable for use in a preferred embodiment of the present invention. In task 205, the satellite communication station initially grants a traffic channel to the subscriber unit.

In task 210, the traffic channel activity is monitored. Other procedures not described here insure that under normal conditions messages are exchanged on a regular basis, for example every second. If a predetermined period of time passes with no exchange of information, it is reasonable to believe that synchronization has been lost, and some action must be taken to re-establish synchronization. In a preferred embodiment, the predetermined period of time is approximately 10 seconds. Neither the frequency of message exchange nor the particular value of 10 seconds is critical to the procedure. The value of time selected is such that synchronization is presumed to have been lost after that time. In a low-Earth orbit satellite based communication system where the communication stations are moving with respect to the subscriber unit, this interval is likely to be fairly small compared to a terrestrial cellular system because of the rapidly changing Doppler frequency shift and propagation delay shift exhibited by a satellite with respect to the subscriber unit. If a satellite determines that it is likely that synchronization has been lost it proceeds with task 220.

In task 220, the modulation technique is changed. In a preferred embodiment, the modulation is changed from QPSK used for normal communications to BPSK which may used for achieving synchronization in a preferred embodiment. While the particular modulation schemes are not essential to the invention, the notion of changing from a normal operational mode to a mode which permits re-synchronization of the link is important to the procedure. Task 220 is desirably performed substantially concurrently with task 110 of procedure 100 described above. The degree of simultaneity required is a function of the time required to re-synchronize and the wait time that is allowed in task 230 below. Both the satellite and the subscriber unit should be in a synchronization mode concurrently for sufficient time to provide a high confidence that synchronization will occur if adequate link margin exists. After making the change to the re-synchronization mode by changing the modulation type, the satellite attempts to cooperatively re-synchronize with the satellite. This is preferably accomplished by the exchange of messages that allow a subscriber unit to estimate an RF Doppler-shift and propagation delay associated with a moving satellite. The estimates are used to correct the subscriber unit's signals. The procedure for accomplishing synchronization is desirably identical to that used for initially establishing synchronization. This procedure is preferably similar to that discussed in regard to task 112.

Task 230 determines if the attempt to resynchronize has failed to occur in a predetermined amount of time. Task 230 is desirably performed concurrently with task 220. If the attempt fails to occur within the predetermined period of time, it may be assumed that it is unlikely to succeed and should be abandoned. In a preferred embodiment the predetermined period of time may be approximately three seconds, but this value is not critical. It should be sufficiently long to allow for a high probability of success if sufficient link margin exists, but should be sufficiently short to allow for other techniques to be applied before the human user abandons the call. Further, it needs to be sufficiently long for tasks 110 through 145 of procedure 100 (FIG. 7) to be performed. This insures that the subscriber unit does not transmit on a channel that has been de-allocated by the satellite and perhaps re-allocated to another subscriber unit. If task 230 is entered because re-synchronization is successful, the satellite 12 proceeds with task 250. If task 230 aborts the re-synchronization attempt because the time limit is exceeded, the satellite proceeds with task 240.

In task 240, the satellite notifies the gateway that the subscriber unit is no longer connected to the satellite. The traffic channel is de-allocated in task 245 so that it can be assigned to another subscriber unit. Task 240 and 245 are not performed if the satellite had not yet notified the gateway that the subscriber unit had connected.

Task 250 determines if the subscriber unit has returned on the same traffic channel to which it was assigned, or has acquired a new traffic channel by execution of the acquisition process. Task 250 determines if presence of the subscriber unit is the result of successful execution of task 110 or task 130 of procedure 100 (FIG. 7). The satellite differentiates these states because the former occurs on the previously allocated traffic channel while the latter involves execution of the acquisition procedure, which does not involve the previously allocated traffic channel. If the subscriber unit is synchronized on the previously allocated traffic channel, the satellite returns to task 210 and resumes monitoring for a loss of synchronization. Otherwise, task 260 is performed.

Task 260 updates the mapping of the physical to logical channels within satellite memory 86 to reflect the subscriber unit's new traffic channel. In a preferred embodiment, during a communication, the satellite maintains an association within its memory associating a particular traffic channel with a particular subscriber ID 33. The logic of the procedure insures that this association is incorrect, leading to the mapping of the subscriber unit's newly allocated traffic channel 17.

Task 270 de-allocates the traffic channel formerly allocated to the subscriber unit. The traffic channel becomes available for allocation to another subscriber unit. Upon completion of task 270, the satellite returns to task 210 to continue monitoring for synchronization loss with the subscriber unit on the newly allocated traffic channel.

Figure 8:
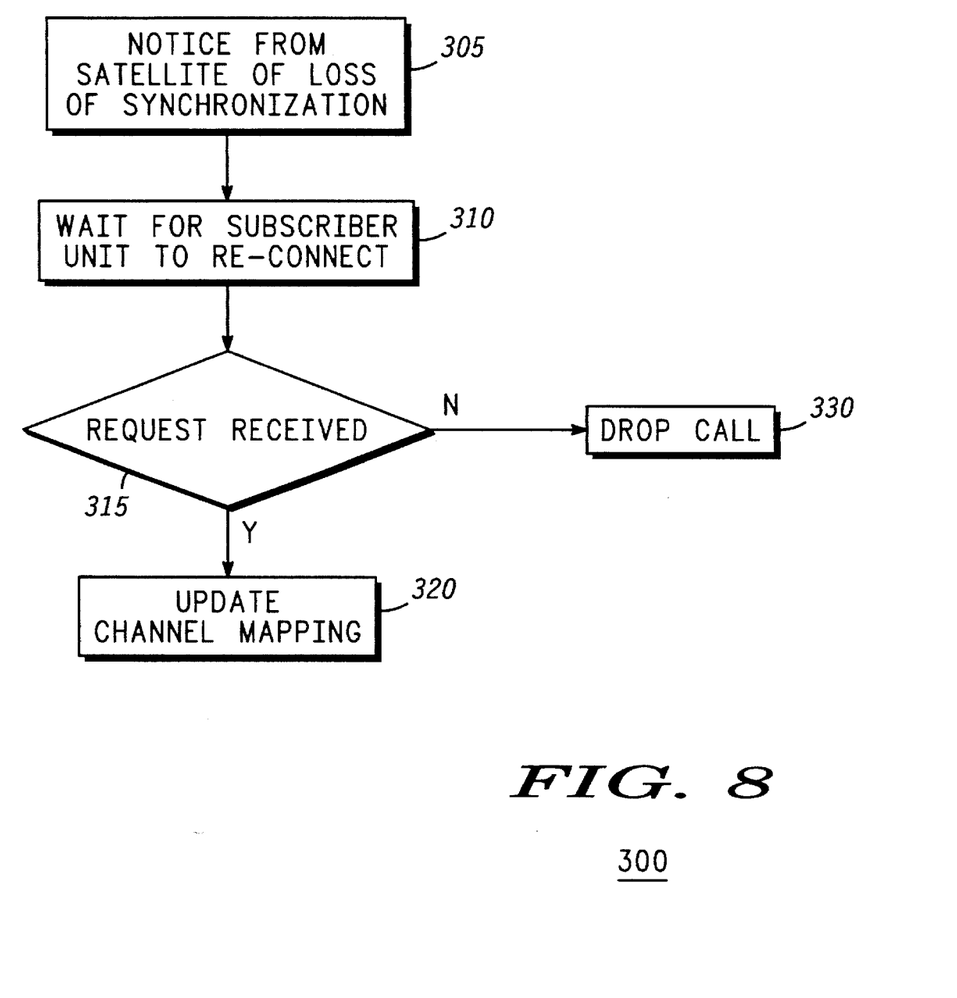
FIG. 8 shows a flow chart of a communication re-establishment procedure performed by a gateway suitable for use in a preferred embodiment of the present invention.

FIG. 8 show a flow chart of communication re-establishment procedure 300 performed by a gateway suitable for use in a preferred embodiment of the present invention. In a preferred embodiment, gateway 22 (FIG. 1) executes procedure 300 which restores a communication connection between a subscriber unit and a satellite communication station when requested by the subscriber unit. Alternatively, procedure 300 may drop the call if the communication connection is reported lost by the satellite and no request is received from the subscriber unit within a predetermined period of time to restore the connection.

In task 305, notification is received from a satellite communication station that a traffic channel is being released because no communications have occurred over a predetermined period of time, for example the last 10 seconds.

In task 310, a timer is activated by the gateway to allow time for the subscriber unit to accomplish tasks 115 through 175 of procedure 100 (FIG. 7). In the preferred embodiment, the time that the gateway waits for the subscriber unit to re-synchronize is approximately ten seconds. The value of ten seconds is not critical but should be sufficiently long to allow a subscriber unit to execute its procedures before the gateway drops the call. Conversely, an excessive amount of time unduly ties up resources within the gateway and potentially within a connected telephone network. The value is desirably determined considering these constraints. Task 315 determines if a request to restore the communication has been received. If a request to restore the communication is received at the gateway before the timer expires, the gateway proceeds with task 320. Otherwise, the gateway proceeds with task 330.

In task 320, the gateway updates the mapping of the logical channel assigned to the subscriber unit to the physical telephone trunk in the gateway. During a communication such as a telephone call, a gateway desirably maintains an association within its memory associating a particular subscriber ID and a TMSI with an actual telephone trunk. When procedure 300 reaches task 320, a new subscriber ID 33 has been assigned to the subscriber unit by the satellite which the subscriber unit recently acquired. Using the TMSI supplied by the subscriber unit, the gateway updates the subscriber ID associated with the specified TMSI, resulting in the association between the new subscriber ID and the old trunk group being established. The updating of subscriber ID effectively restores the call, and the procedure ends.

In task 330, the telephone trunk formerly allocated to the subscriber unit is made available for allocation to another subscriber unit. Upon completion of this task, procedure 300 ends.

While the invention has been described in terms of specific examples and with specific preferred embodiments, it is evident that many alternatives and variations will be apparent to those skilled in the art based on the description herein, and is intended to include such variations and alternatives in the claims.

What is claimed is:

1. A method of re-establishing a communication link between a communication station and a subscriber unit comprising the steps of:

(a) monitoring by said subscriber unit, an information exchange on said communication link to detect a loss of synchronization;

(b) changing by said subscriber unit, a modulation technique of said communication link to re-synchronize said subscriber unit and said communication station when said loss of synchronization is detected;

(c) determining if said subscriber unit has been assigned a subscriber identifier by said communication station; and (d) performing an acquisition attempt on another antenna beam of said communication station using said subscriber identifier, steps (c) and (d) being performed by said subscriber unit when step (b) fails to re-synchronize.

2. A method as claimed in claim 1 wherein step (b) is performed when step (a) determines that no information is exchanged for a predetermined period of time.

3. A method as claimed in claim 2 wherein step (b) comprises the step of changing said modulation technique from Quadrature Phase Shift Keyed (QPSK) modulation to Bi-Phase Shift Keyed (BPSK) modulation.

4. A method as claimed in claim 1 further comprising the steps of:

(e) determining if said subscriber unit has been assigned a temporary mobile subscriber identification (TMSI) by a gateway;

(f) determining if an available antenna beam exists on another communication station; and (g) performing said acquisition attempt on said available antenna beam.

5. A method as claimed in claim 4 further comprising the steps of:

said subscriber unit identifying itself to said gateway using said TMSI; and requesting connection to said gateway, said gateway using said TMSI to re-establish said communication link.

6. A method of re-establishing a loss of synchronization between a communication station and a subscriber unit comprising the steps of:

(a) assigning a radio frequency (RF) traffic channel to said subscriber unit, said RF traffic channel comprising a frequency and time-slot assigned from a plurality of frequency and time-slot combinations;

(b) monitoring by said communication station, an information exchange between said subscriber unit and said communication station on said RF traffic channel to detect a loss of synchronization;

(c) changing by said communication station, a modulation technique on said RF traffic channel when said loss of synchronization is detected; and (d) re-synchronizing with said subscriber unit on another RF traffic channel using a changed modulation technique, said another RF traffic channel comprising a different frequency and time-slot combination of said plurality.

7. A method of re-establishing a loss of synchronization between a communication station and a subscriber unit comprising the steps of:

(a) assigning a traffic channel to said subscriber unit;

(b) monitoring by said communication station, an information exchange between said subscriber unit and said communication station on said traffic channel to detect a loss of synchronization;

(c) changing by said communication station, a modulation technique on said traffic channel when said loss of synchronization is detected;

(d) re-synchronizing with said subscriber unit using a changed modulation technique;

(e) waiting a predetermined period of time for re-synchronizing with said subscriber unit; and (f) notifying a gateway to make said traffic channel available for other communications when re-synchronization does not occur within said predetermined period of time.

8. A method as claimed in claim 7 further comprising the steps of:

(g) determining if said subscriber unit has been assigned a subscriber identifier by said communication station; and (h) performing an acquisition attempt on another antenna beam of said communication station using said subscriber identifier, steps (c) and (d) being performed by said subscriber unit when step (b) fails to re-synchronize.

9. A method as claimed in claim 7 wherein step (e) comprises the step of waiting for approximately ten seconds for synchronizing with said subscriber unit.

10. A communication system that re-establishes a communication link with a subscriber unit after a loss of synchronization comprising:

a communication station; and a gateway linked with said communication station, wherein said gateway comprises:

means for assigning a radio frequency (RF) traffic channel to said subscriber unit, said RF traffic channel comprising a frequency and a time slot assigned from a plurality of frequency and time-slot combinations;

means for monitoring an information exchange between said subscriber unit and said communication station on said RF traffic channel to detect a loss of synchronization;

means for changing by said communication station, a modulation technique of said RF traffic channel when said loss of synchronization is detected; and means for re-synchronizing with said subscriber unit on another RF traffic channel using a changed modulation technique, said another RF traffic channel comprising a different frequency and time-slot combination of said plurality.

11. A communication system that re-establishes a communication link with a subscriber unit after a loss of synchronization comprising:

a communication station; and a gateway linked with said communication station, wherein said gateway comprises:

means for assigning a traffic channel to said subscriber unit;

means for monitoring an information exchange between said subscriber unit and said communication station on said traffic channel to detect a loss of synchronization;

means for changing by said communication station, a modulation technique of said traffic channel when said loss of synchronization is detected; and means for re-synchronizing with said subscriber unit using a changed modulation technique, and wherein said communication station further comprises:

means for waiting a predetermined period of time for re-synchronizing with said subscriber unit; and means for notifying said gateway to make said traffic channel available for other communications when re-synchronization does not occur within said predetermined period of time.

12. A communication system as claimed in claim 11 wherein said communication station further comprises:

means for determining if said subscriber unit has been assigned a subscriber identifier by said communication station; and means for performing an acquisition attempt on another antenna beam of said communication station using said subscriber identifier.

13. A subscriber unit that cooperatively re-establishes a communication link with a communication system, said subscriber unit comprising:

a transceiver; and a controller coupled to said transceiver, wherein said transceiver comprises:

means for monitoring an in information exchange on said communication link to detect a loss of synchronization; and means for changing a modulation technique on said communication link to re-synchronize with a communication station of said communication system when said loss of synchronization is detected, and wherein said controller comprises:

means for determining if said subscriber unit has been assigned a subscriber identifier by said communication station; and means for performing an acquisition attempt on another antenna beam of said communication station using said subscriber identifier when said subscriber unit fails to re-synchronize.

14. A subscriber unit as claimed in claim 13 wherein said controller further includes:

means for determining if said subscriber unit has been assigned a temporary mobile subscriber identification (TMSI) by a gateway;

means for determining if an available antenna beam exists on another communication station; and means for performing said acquisition attempt on said available antenna beam.

* * * * *